United States Patent [19]

Misra

[11] Patent Number: 5,931,889

[45] Date of Patent: Aug. 3, 1999

[54] CLOCK-AIDED SATELLITE NAVIGATION RECEIVER SYSTEM FOR MONITORING THE INTEGRITY OF SATELLITE SIGNALS

[75] Inventor: Pratap N. Misra, Sudbury, Mass.

[73] Assignee: Massachusetts Institute of Technology, Cambridge, Mass.

[21] Appl. No.: 08/681,896

[22] Filed: Jul. 29, 1996

Related U.S. Application Data

[63] Continuation-in-part of application No. 08/377,413, Jan. 24, 1995, Pat. No. 5,623,414.

[51] Int. Cl.$^6$ .............................. H04B 7/185; G06F 19/00
[52] U.S. Cl. .......................... 701/213; 701/200; 342/357; 342/358
[58] Field of Search .................................... 701/200, 207, 701/213, 214, 215, 216; 342/352, 357, 358, 417

[56] References Cited

U.S. PATENT DOCUMENTS

| | | | |
|---|---|---|---|
| 4,578,678 | 3/1986 | Hurd | 343/357 |
| 4,689,626 | 8/1987 | Hori et al. | 342/357 |
| 4,918,609 | 4/1990 | Yamawaki | 364/449 |

(List continued on next page.)

OTHER PUBLICATIONS

"A General RAIM Algorithm Based on Receiver Clock," Misra et al., Proceedings of ION, 9/15/95.
"Adaptive Modeling of Receiver Clock for Meter–Level DGPS Vertical Positioning," Misra et al., Proceedings of ION, 9/14/95.
Pratap N. Misra et al., "Role of the Clock in a GPS Navigation Receiver", *MIT Lincoln Laboratory*, May 1994.
Pratap N. Misra et al., "Clock–Aided RAIM for WAAS: Category I Precision Approaches", *MIT LIncoln Laboratory*, Nov. 1994.
Sturza, "GPS Navigation Using Three Satellites and a Precise Clock", *Litton Aero Products*, Mar. 1993.
McBurney et al., "Receiver Clock Stability: An Important Aid in the GPS Integrity Problem",*Proceedings of the ION National Technical Meeting*, Jan. 1988.
Knable et al., "Clock Coasting and Altimeter Error Analysis for GPS",*Proceedings of the ION National Technical Meeting*, 1984.
Milliken, R.J., et al, "Principle of Operation of NAVSTAR and System Characteristics",*Global Positioning System*, pp. 3–14, (1980).
Lee, Young C., Analysis of RAIM Function Availability for GPS Augmented with Barometric Altimeter Aiding and Clock Costing, pp. 1–14 (1992).

*Primary Examiner*—Gary Chin
*Attorney, Agent, or Firm*—Testa, Hurwitz & Thibeault, LLP

[57] ABSTRACT

A satellite navigation receiver system detects faulty range measurement signals from navigation satellites and excludes them from future position estimates. This system includes a receiver coupled to a movable object. The receiver includes a stable clock with a constant frequency drift rate over a predetermined period of time. A processor coupled to the receiver models the behavior of the clock over a time period equivalent to the period of constant frequency drift rate. The processor then generates predicted clock bias estimates over a future period of time equivalent in length to the period modeled, generates an instantaneous clock bias estimate using satellite signals, and determines the difference between the instantaneous clock bias estimate and a predicted instantaneous clock bias estimate. If the difference does not fall within an acceptable limit, one or more signals are determined to be faulty. When at least five satellites are in view, the processor determines which satellites have generated the faulty signals by generating sets of position and clock bias estimates and performing four- and three-dimensional estimation to determine consistency of the sets. An inconsistent set suggests the existence of a malfunctioning satellite. Signals from malfunctioning satellites are excluded from future position estimates.

21 Claims, 4 Drawing Sheets

5,931,889
Page 2

U.S. PATENT DOCUMENTS

| | | | |
|---|---|---|---|
| 4,928,106 | 5/1990 | Ashjaee et al. | 342/352 |
| 5,153,599 | 10/1992 | Harigae et al. | 342/352 |
| 5,225,842 | 7/1993 | Brown et al. | 342/357 |
| 5,293,170 | 3/1994 | Lorenz et al. | 342/352 |
| 5,319,374 | 6/1994 | Desai et al. | 342/387 |
| 5,436,632 | 7/1995 | Sheynblat | 342/357 |
| 5,440,313 | 8/1995 | Osterdock et al. | 342/352 |
| 5,440,491 | 8/1995 | Kawano et al. | 364/443 |
| 5,477,458 | 12/1995 | Loomis | 701/213 |
| 5,483,456 | 1/1996 | Kuwahara et al. | 364/449 |
| 5,490,076 | 2/1996 | Rawicz et al. | 364/459 |
| 5,495,257 | 2/1996 | Loomis | 701/213 |
| 5,502,641 | 3/1996 | Isomura | 701/215 |
| 5,506,781 | 4/1996 | Cummiskey et al. | 364/459 |
| 5,526,291 | 6/1996 | Lennen | 701/214 |
| 5,563,607 | 10/1996 | Loomis et al. | 701/213 |
| 5,623,414 | 4/1997 | Misra | 701/207 |
| 5,757,677 | 5/1998 | Lennen | 701/214 |
| 5,808,581 | 9/1998 | Braisted et al. | 701/213 |

CLOCK-AIDED SATELLITE NAVIGATION RECEIVER SYSTEM FOR MONITORING THE INTEGRITY OF SATELLITE SIGNALS

CROSS-REFERENCE TO RELATED APPLICATION

This application is a continuation-in-part of U.S. Ser. No. 08/377,413, now U.S. Pat. No. 5,623,414, filed on Jan. 24, 1995, incorporated herein by reference.

STATEMENT OF FEDERALLY SPONSORED RESEARCH

This invention was made with government support under contract no. DTFA01-95-Z-02046 awarded by the FAA. The U.S. government has certain rights in the invention.

TECHNICAL FIELD

This invention relates to a clock-aided satellite navigation receiver system for detecting faulty signals transmitted by satellites in a global navigation satellite system.

BACKGROUND INFORMATION

Global navigation satellite systems such as GPS and GLONASS, now deployed by the United States and Russia, represent a revolutionary change in navigation and positioning technology. One of the areas affected profoundly by the availability of satellite-based navigation (SatNav) is civil aviation, where these systems show an enormous promise for enhancing economy as well as safety. Planning is underway in the U.S. to switch to GPS-based navigation and surveillance in all phases of flight, and government approval to do so has been received.

Satellite navigation provides the user with estimates of the three coordinates of the user's position: x, y, and z. System receivers measure and analyze signals from satellites, and estimate the corresponding three coordinates of the receiver position, as well as the instantaneous receiver clock bias. The quality of these estimates depends upon the number and the geometry of satellites in view, and whether the satellites are operating properly. Conventional receivers operating with satellite navigation systems measure the transit time of a signal from a satellite to determine the distance or range from the satellite to the user. This range is determined mathematically by the speed of light multiplied by the signal transit time.

If receiver clocks were perfectly synchronized with the satellite clocks, only three range measurements would be needed to allow a user to compute a three-dimensional position. This process is known as multilateration. However, given the expense of providing a receiver clock whose time is exactly synchronized, conventional systems have found a way to account for the amount by which the receiver clock time differs from the satellite clock time when computing a user's position. This amount, hereinafter referred to as the clock bias, has been determined by computing a measurement from a fourth satellite using a processor in the receiver that correlates the ranges measured from each satellite. This process requires four or more satellites from which four or more measurements can be obtained to estimate four unknowns x, y, z, b. The processor can be programmed either to subtract from or add time to all of the measurements, continuing to do so until it satisfies a three-dimensional mathematical model of the satellite positions, the user's position, and the measured transit times. The amount b, by which the processor has added or subtracted time is the instantaneous bias between the receiver clock and the satellite clock. The range measurements with a common offset due to this bias are referred to as pseudoranges.

Obtaining measurements from four satellites in view does not necessarily assure a good position estimate. The quality of a position estimate largely depends upon two factors: satellite geometry, particularly, the number of satellites in view and their spatial distribution relative to the user, and the quality of the pseudorange measurements obtained from satellite signals.

Satellite geometry is characterized by a parameter called Dilution of Precision (DOP). This parameter, DOP, can be thought of geometrically as roughly inversely proportional to the volume of a polyhedron with the receiver being at the apex and the satellite positions defining the base. Generally, the larger the number of satellites in view and the greater the distances therebetween, the better the geometry of the satellite constellation. The quality of pseudorange measurements is affected by errors in the predicted ephemeris of the satellites, instabilities in the satellite and receiver clocks, ionospheric and tropospheric propagation delays, multipath, receiver noise and RF interference. The collective effect of these errors is referred to as the User Range Error (URE). The root mean square (rms) value of the User Range Error is expressed as $\sigma URE$. The error associated with the position estimate can be expressed as a rms value calculated in terms of these factors; $\sigma URE$ and DOP, and represented mathematically by RMS position error=(DOP)($\sigma URE$).

In order to avoid the hazards associated with erroneous position estimates, civil aviation regulations require that the integrity of the navigation system be monitored and that the user be warned when a position estimate obtained from it should not be used. In satellite navigation, such integrity monitoring, when performed within a receiver, is referred to as receiver autonomous integrity monitoring (RAIM). Conventional methods for carrying out RAIM require that at least five satellites be in view in order to detect the presence of faulty signals, and that at least six satellites be in view in order to identify a faulty signal.

Additionally, the constellations of GPS and GLONASS are such that the number of satellites in a user's view would depend upon a user's location and would change with time due to the movement of satellites. At certain times, some of the users may have fewer than five satellites in view. As a result, these users will not be able to perform RAIM, and thus will not be able to rely on position estimates obtained from these satellite systems.

SUMMARY OF THE INVENTION

It is therefore an object of the invention to provide a navigation receiver system, and a related method, capable of performing fault detection when only four satellites are in view. It is yet another object of the invention to provide a navigation receiver system capable of performing fault exclusion when only five satellites are in view and at least four satellites are providing consistent range measurements. The present invention is particularly useful in civil aviation, where knowledge of faulty signals can enable a pilot to recognize the problem and switch to an alternate navigation system for continued flight guidance, and exclusion can enable a pilot to continue to use a satellite navigation system without a break due to faulty signals.

These and other objects of the invention are provided by a navigation receiver system, and a related method, for detecting faulty measurements from satellites in a satellite navigation system such as GPS or GLONASS and for identifying the faulty signals and the satellites that generated them. By identifying faulty signals, subsequent signals transmitted by such potentially malfunctioning satellites can be excluded from an estimation of user position. The navigation receiver system of the present invention can include a receiver, a software-programmable computer, and a receiver clock, the frequency of which is stable or changes in a predictable manner over at least a predetermined period of time.

In the system of the present invention, the receiver receives signals representative of range measurements from at least four satellites in a satellite navigation system. The signals are processed by the computer which determines position estimates of the movable object and then computes from such signals an estimate of the instantaneous bias in the receiver clock relative to satellite system time. The computer models the bias of the clock over a predetermined period of time during which the frequency drift rate is stable, and the computer generates smoothed clock bias estimates. These estimates are used to predict clock bias estimates for a future time period. The future time period for which predicted clock bias estimates are determined is of a length of time consistent with the period of time during which the frequency drift rate is verified as being stable.

The navigation receiver system of the present invention uses the predicted clock bias estimates as a basis to determine whether faulty measurements have been obtained from any malfunctioning satellites. By predicting a correct value for the clock bias estimate, it can be determined whether there is an error associated with an instantaneous measurement obtained using signals from the satellites in view. This is performed by a computer which determines the instantaneous clock bias and subtracts the predicted clock bias estimate therefrom, generating a clock bias discrepancy representing the extent of disagreement therebetween. The computer then determines whether the clock bias discrepancy conforms to a predetermined clock bias discrepancy limit stored in memory. If the discrepancy falls outside of the discrepancy limit, a faulty measurement may be present and the user is alerted.

Having concluded that a measurement set may include faulty measurements, the method of the invention determines whether at least five satellites are in view. If the appropriate number of satellites are in view, the computer performs a consistency check of the measurements by estimating (x, y, z, b) with subsets comprising at least four measurements, to determine if at least four fault-free measurements exist. If at least four measurements are fault-free, the difference between the instantaneous clock bias estimate and the predicted clock bias estimate is computed to determine whether the value obtained lies within a predetermined clock threshold stored in memory. If it is within the clock threshold, a final consistency check is carried out through three-dimensional estimation using a predicted clock bias estimate to ensure that the chosen measurement set does not contain any faulty measurements. If so, the user may continue to rely on the position estimates received from the signals transmitted by satellites providing the consistent measurements.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

The invention described herein utilizes the following definitions for purposes of clarity. A clock is defined as any mechanism which records, tracks, displays, or in any other manner accounts for the passage of time. Clock bias is defined as the amount by which a clock is recording, tracking, displaying, or accounting for time in relation to another clock, particularly the amount by which one clock is faster than or slower than another clock. Frequency drift rate is defined as the rate by which a clock increases or decreases its speed in recording, tracking, displaying, or accounting for the passage of time.

Figure 1A:
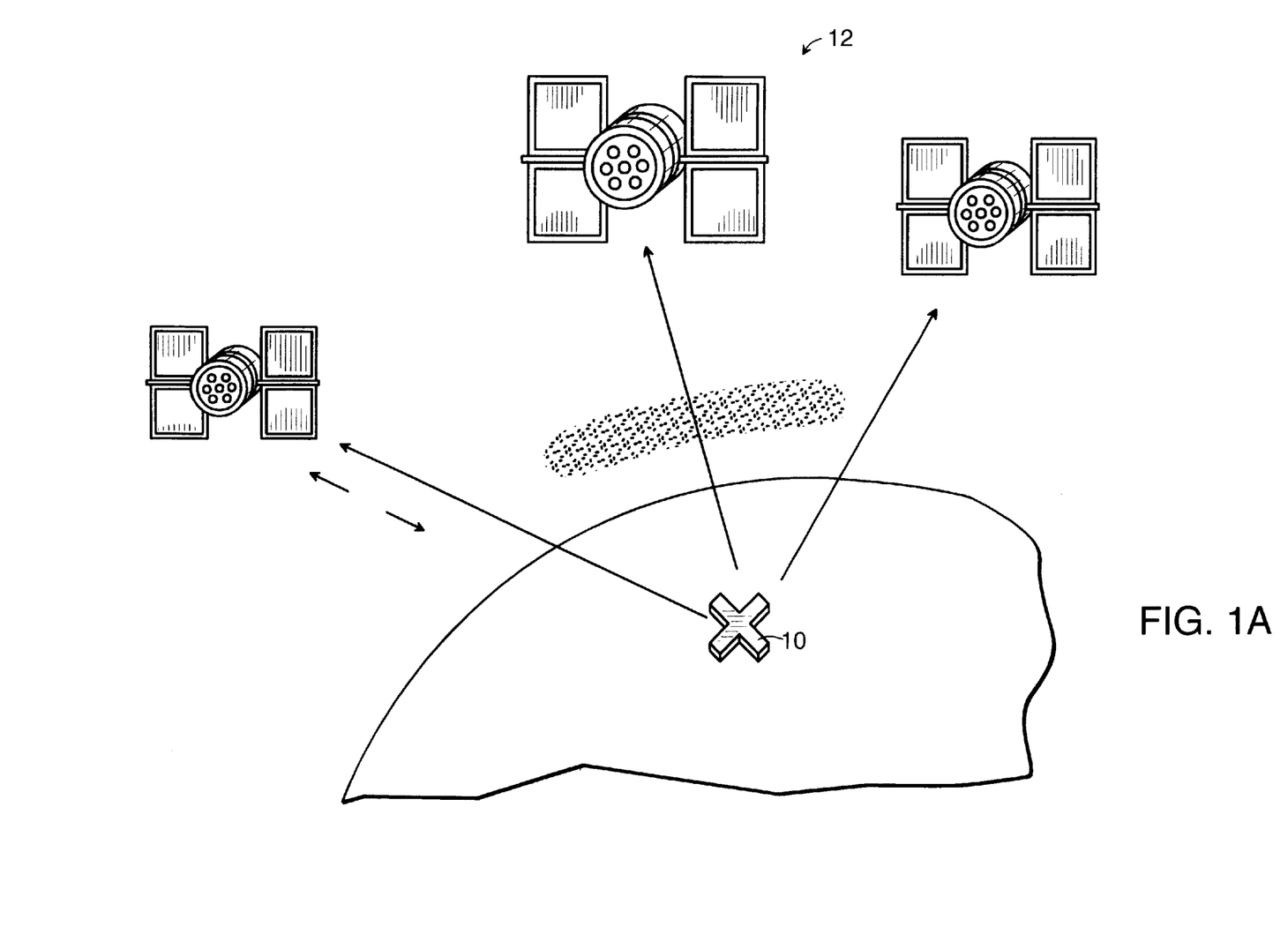
FIG. 1A shows a movable object whose position is being estimated with the aid of satellite navigation.

Referring to FIG. 1A, the position of a movable object 10 (e.g., an aircraft in the air) is determined with range measurements obtained by using signals from a satellite navigation system 12. Within the movable object 10 or removably coupled thereto is a satellite receiver system as further shown in FIG. 1B. The satellite receiver system receives and processes signals received from satellites to determine an estimate of the position of the movable object, and whether any of the signals used to obtain the estimate are faulty.

Figure 1B:
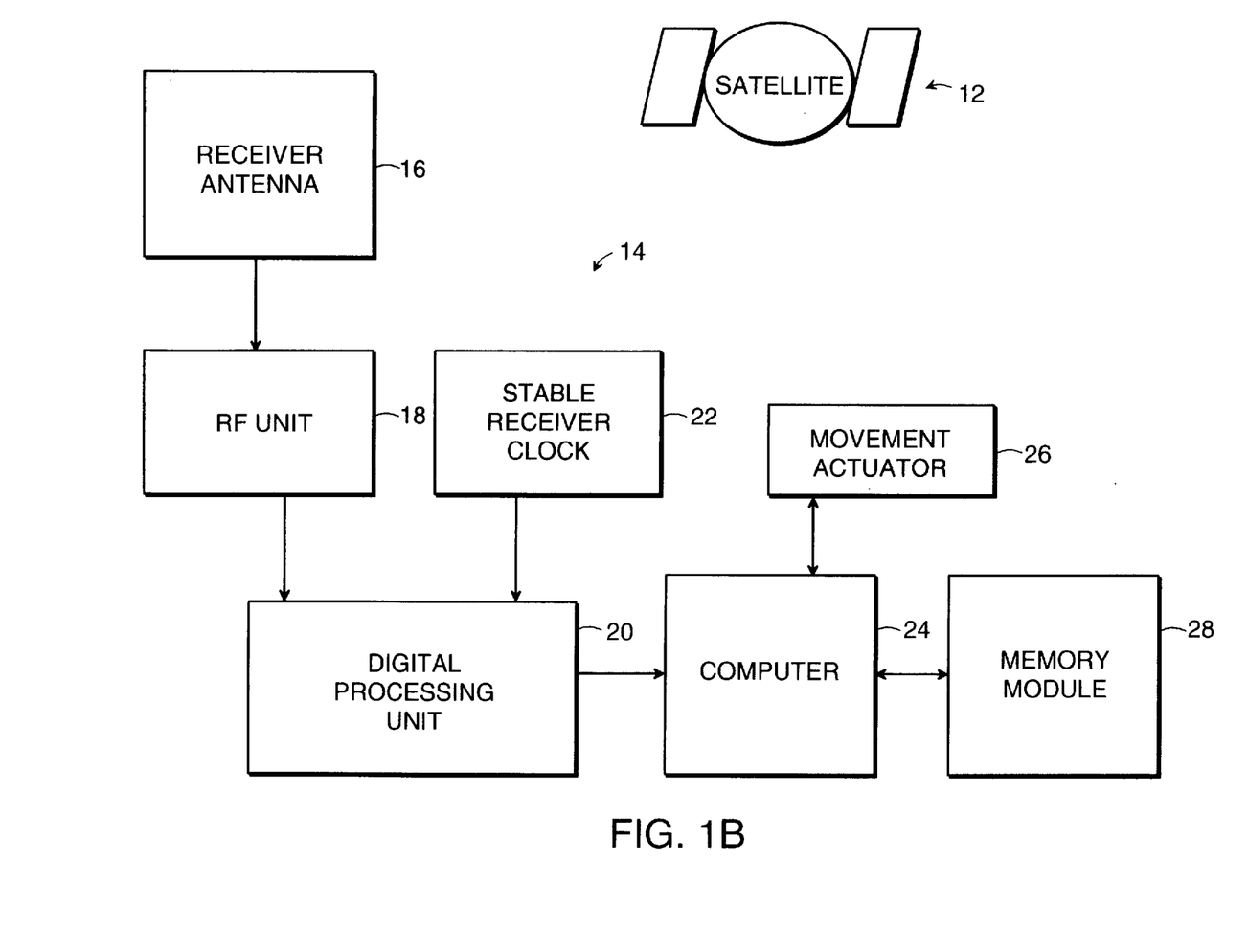
FIG. 1B shows one embodiment of the system of the present invention for performing fault detection and exclusion.

Referring to FIG. 1B, the receiver system 14 preferably comprises a receiver antenna 16, a RF unit 18 through which the satellite signals received from the receiver antenna 16 pass, and a digital processing unit 20 (e.g., an analog-to-digital converter) which creates digital signals representing pseudorange measurements. Also connected to the digital processing unit 20 is a stable receiver clock 22 that has a constant frequency drift rate over at least a predetermined period of time, for example an oven controlled crystal operator (OCXO) having a constant frequency drift rate for 0.5–1 hour. The receiver clock 22 is not limited to OCXO's, and can be represented by, for example, a cesium standard clock, a rubidium oscillator, a temperature controlled crystal operator (TCXO), or generally any clock having a constant frequency drift rate over a period of time. The digital processing unit 20 further creates signals representing the receiver clock bias.

The digital processing unit 20 is coupled to a software-programmable computer 24. The computer 24 typically includes at least a microprocessor. After the digital processing unit 20 creates signals representing the pseudorange measurements and the clock bias, these signals are sent to the software-programmable computer 24 where a processing scheme provides the user with information relating to the integrity of the satellite signals from which the pseudorange measurements have been obtained. The processing scheme, further described below in connection with the flow chart of FIG. 2, detects, when at least 4 satellites are in view, whether signals transmitted by one or more satellites are faulty, and determines, when at least five satellites are in view, which satellite(s) has transmitted such faulty signals. The computer 24 is coupled to a memory module 28 (e.g., RAM, ROM, flash memory, hard disk, CD ROM, and/or other computer data storage media) having a plurality of storage locations for storing a magnification factor, an alert limit, a clock bias discrepancy limit, and a clock threshold, all of which are used by the processing scheme as further described in connection with FIG. 2.

Also shown in FIG. 1B is a movement actuator 26 through which the position of the object 10 can be altered. The actuator 26 can be, for example, a mechanical or electro-mechanical actuator on an airplane. The computer 24 can directly cause the actuator 26 to move in response to a position estimate on a desired path, or alternatively, an operator of the movable object 10 can be apprised of the integrity of the position estimate and make an independent determination as to whether a position or course change is appropriate.

The processing scheme employed by the computer of the present invention utilizes the correlation that exists between the error in the clock bias estimate and the error in a position estimate. As will be further described below, by using a clock having a constant or stable frequency drift rate, the clock bias can be predicted, and the discrepancy between the predicted value of clock bias and the clock bias estimate can be determined. Given the correlation between the errors in the clock bias estimate and the position estimate, this discrepancy can serve as a basis for monitoring the integrity of the current position estimate.

Figure 2:
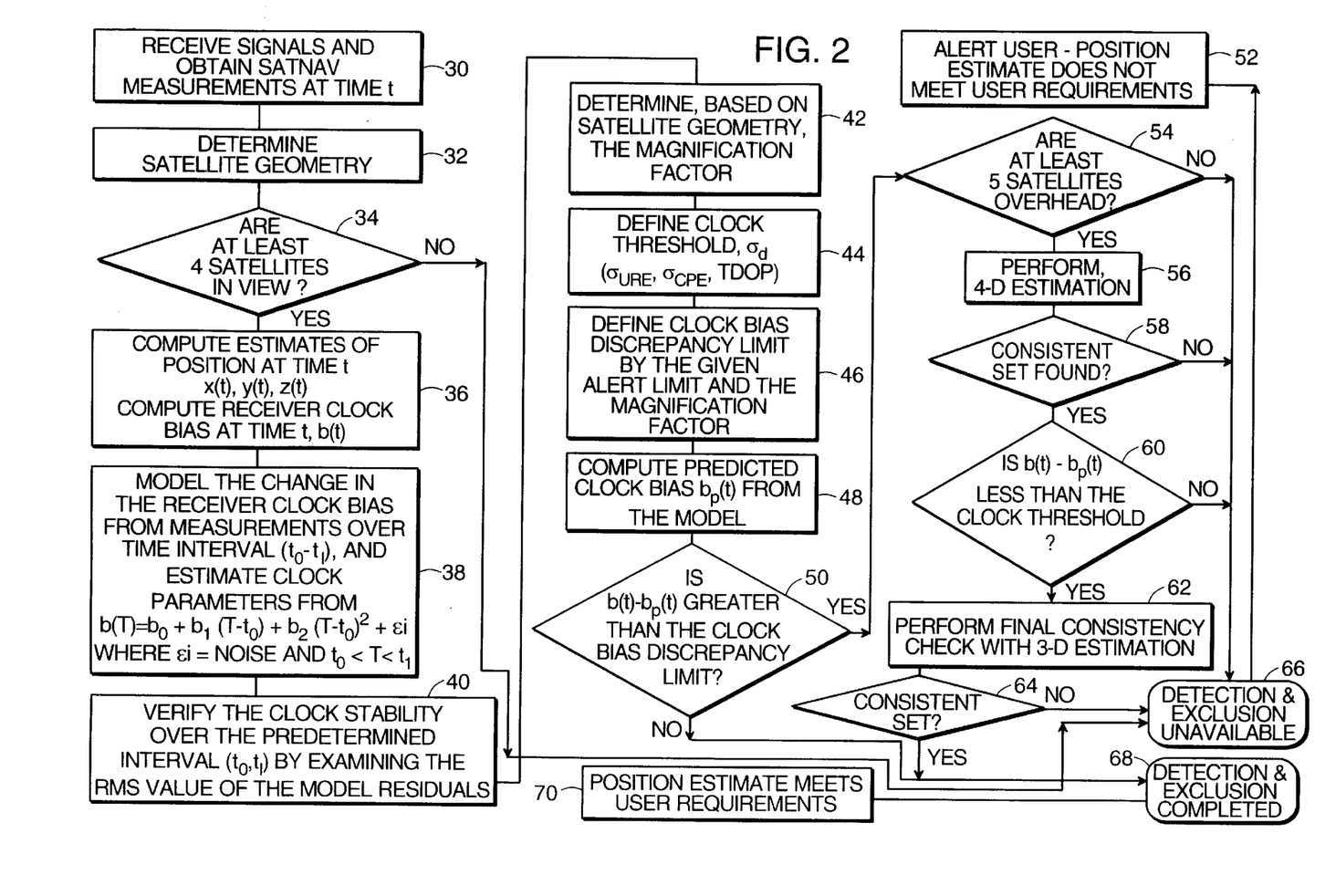
FIG. 2 shows a flow chart implementing the fault detection and exclusion scheme of the present invention.

Referring to the flow chart of FIG. 2, in step 30, the receiver antenna 16 receives signals from which range measurements are computed from time to to time $t_1$. For purposes of explanation, both times $t_0$ and $t_1$ are times before an instantaneous time t, a time at which the fault detection and exclusion scheme is to be executed to determine the integrity of the signals received. Generally, the stability of the clock is relevant to determine how long the interval $t_0$ to t should be, as the clock bias can only be predicted for a time interval during which the clock frequency drift rate is constant. Hypothetically, if the clock has a constant frequency drift rate for one hour, the interval $t_0$ to t should be less than or equal to one hour. In step 32, the computer 24 determines the geometry of the satellites in view from the number of satellites and their spatial distribution relative to the user. In step 34, the computer 24 determines whether at least four satellites are in view. If fewer than four satellites are in view, control goes to step 66, as fault detection and exclusion cannot take place with a constellation of less than four satellites.

In step 36, the computer 24 computes the user position estimates x, y, z and the clock bias estimate b at the instantaneous time t. Given n satellites in view, the position of the jth satellite at time t is denoted by coordinates $x_j$, $y_j$, $z_j$, where j=1, 2, 3 ... n. The range measurement to the jth satellite is $r_j$. Thus, using the following set of equations for as many satellites as are in view, the computer 24 solves for unknowns x, y, z, and b:

$$\sqrt{((x_j-x)^2+(y_j-y)^2+(z_j-z)^2} = r_j + b + \varepsilon_j$$

where $\varepsilon_j$ is the measurement error (URE).

Once the values of the instantaneous receiver clock bias $b(\tau)$ are known, for values of $\tau$ over the time interval of $t_0$ to $t_1$, where $t_0$ and $t_1$ are less than time t, the computer 24 in step 38 models the receiver clock bias so that smoothed estimates of clock bias are obtained for that time period. Generally, this period of time is less than the time period for which the receiver clock is stable. The smoothed clock bias estimates provide a prediction of what the clock bias estimates will be for a period of time beyond time $t_1$. The clock bias is modeled in step 38 for the interval $t_0$ to $t_1$ using the quadratic function:

$$b(\tau)=b_0+b_1(\tau-t_0)+b_2(\tau-t_0)^2$$

Parameters $b_0$, $b_1$, and $b_2$ are estimated from the available measurements provided by the satellites for values of time $\tau$ between $t_0$ and $t_1$.

After modeling the clock bias using the quadratic function, control proceeds to step 40, and the computer 24 verifies the stability of the clock over the interval $t_0$ to $t_1$. This is carried out by examining the rms residual error in the model obtained in step 38. The computer 24 of the present invention is programmed such that the rms error in the clock bias estimate $\sigma_b$ based upon a single snapshot of the pseudorange measurements is computed by:

$$\sigma_b = (\sigma_{URE})\text{ (TDOP)}$$

where $\sigma_{URE}$ is the rms error in the range measurements, and TDOP is the time dilution of precision parameter reflecting the satellite geometry. For the constellations of GPS and GLONASS, time dilution of precision, TDOP, typically falls within the range of 0.75 and 1.25. Given k statistically independent snapshots in the time interval $t_0$–$t_1$, the rms error in the clock bias estimate b(t), may be computed as $\sigma_b \approx \sigma_{URE}/\sqrt{k}$. The number of independent measurement snapshots obtained from GPS depends upon the correlation time of the measurements.

In step 42, the computer 24 determines, based on satellite geometry, a parameter called horizontal error to clock error magnification factor, hereinafter referred to as the magnification factor. The magnification factor is useful in identifying the rare situation where an anomaly in the measurement from a satellite has little effect on the clock bias estimate, b, but has a significant effect on the position estimate, x. The computer 24 determines the magnification factor by calculating for each satellite in view, the ratio of position error to clock bias error that would be introduced as a result of an anomalous pseudorange measurement from that satellite. The largest of these ratios is defined as the magnification factor. The magnification factor is used to define the clock bias discrepancy limit, as further described in step 46.

In step 44 the clock threshold is determined by the computer 24. The clock threshold reflects the statistical variability of the clock bias estimates introduced due to typical measurement errors. These measurement errors can be expressed in terms of time dilution of precision, TDOP, the rms value of the user range error, $\sigma_{URE}$, and the rms value of the clock prediction error, $\sigma_{CPE}$. The computer 24 thus determines the clock threshold $\sigma_d$ by taking the rms value of these terms, given by:

$$\sigma_d = \sqrt{((TDOP)^2(\sigma_{URE})^2 + (\sigma_{CPE})^2}$$

As further described in step 60, the clock threshold is useful in determining if the difference between the instantaneous clock bias and the predicted clock bias is indicative of the receipt of faulty signals.

In step 46 the clock bias discrepancy limit is determined and set by the computer 24. The clock bias discrepancy limit is the permissible deviation that can exist between the predicted clock bias estimate and the instantaneous clock bias estimate. To obtain the value of this discrepancy limit, the computer 24 processes two parameters, an alert limit and the magnification factor.

Civil aviation regulations prescribe the permissible limit on "missed detection" by a receiver autonomous integrity monitoring (RAIM) scheme. "Missed detection" relates to a probability that the RAIM scheme will fail to detect instances when the user's position error exceeds a predefined threshold due to a measurement anomaly. This predefined threshold is the alert limit, the largest permissible error in an estimate of position obtained from a navigation system. The value of the alert limit, specified by regulations, varies with the phases of flight (i.e. non-precision, precision, en route, and oceanic), and reflects the demands of traffic density and the proximity of obstacles in the air and on the ground.

For example, a non-precision approach to a runway is a standard instrument approach procedure during which the navigation system is required to provide to a pilot having no visual cues, guidance without exceeding the permissible lateral deviation from a predefined approach path to the runway. The currently prescribed alert limit for such an approach is about 555 m. Should the navigation system provide the user with a position estimate with an error that exceeds the alert limit, a potentially hazardous condition exists. A RAIM scheme should detect this condition and apprise the pilot of it. Failure of the RAIM scheme to detect a hazardous condition must be rare. The probability of such failure is currently required to be less than $10^{-7}$.

A RAIM scheme must balance the stringent requirement of detecting an anomalous position estimate against a prescribed limit on false alarms, which can often cause a pilot to abort an otherwise successful flight approach. The prescribed limit on false alarms is defined as the likelihood that a receiver falsely concludes that the alert limit is exceeded when no measurement anomaly may exist and the error in the position estimate has not exceeded the alert limit. A RAIM scheme capable of meeting these requirements is characterized by its "availability." "Availability" is typically defined as the probability that the RAIM scheme can properly operate given the constraints of the particular phase of flight, namely, the prescribed alert limit, the limits on missed detection, and the limits on false alarms. If the availability of a RAIM scheme is 75%, this suggests that the user will be unable to perform RAIM 25% of the time. Thus, the user can rely on satellite navigation only 75% of the time (when RAIM is available). Clearly, the higher the availability, the more useful is the RAIM scheme. Ideally, an availability of 100% is desirable.

Still referring to step 46, the magnification factor is calculated for a given satellite geometry. The magnification factor is a measure of the potential of a satellite geometry to mask the effect of anomalous measurements on the clock bias estimate. The clock bias discrepancy limit takes into account both factors, the magnification factor and the alert limit, and is mathematically determined by the alert limit divided by the magnification factor. As further described in step 50, the clock bias discrepancy limit is used as a measure to detect faulty measurements. If the difference between the instantaneous clock bias estimate and the predicted clock bias estimate exceeds the clock bias discrepancy limit, the measurement set is indicated as being faulty.

In step 48, the predicted clock bias estimate $b_p$ (t) at the instantaneous time t is computed from the model defined in step 38. As further shown in this step, the actual clock bias at the instantaneous time (referred to as the instantaneous clock bias) b (t), is determined.

In step 50, the discrepancy between the instantaneous clock bias b(t) and the predicted clock bias $b_p$ (t) for the instantaneous time is determined by the computer 24. The computer 24 then takes the calculated clock bias discrepancy and compares it with the clock bias discrepancy limit determined in step 46 to determine if it is greater than the limit. If the discrepancy is greater than the limit, control goes to step 54 and the computer 24 determines if any faulty signals have been received. If the discrepancy is less than the discrepancy limit, control is routed to step 68 which indicates that the process of fault detection and exclusion has been completed, the measurements are fault-free and the position estimate obtained from them meets the user's integrity requirements. In this instance, the user is assured that all of the satellites from which the measurements have been obtained are functioning properly.

However, should the discrepancy between the instantaneous clock bias b (t) and the predicted clock bias $b_p$ (t) fall beyond the discrepancy limit, the computer 24 determines if at least five satellites are in view, as shown in step 54. Five satellites at a minimum, are required to perform a consistency check on the measurements. Five satellites will provide five pseudorange measurements which the computer 24 uses to determine whether at least four of the measurements are consistent. If at least five satellites are not in view, control goes to step 66 and a signal is provided to the user indicating that fault detection and exclusion is not available. In this instance, the user would switch to an alternate navigation system, as the satellite navigation system is providing faulty measurements and the constellation does not permit the system to determine which signals are faulty.

In step 56, the computer 24 performs four-dimensional estimation (i.e., estimation of x, y, z, and b) to determine whether at least four consistent measurements have been obtained. Estimates of position and clock bias are made in a four-dimensional estimation, by using four or more equations with four unknowns. Although five or more equations are generated by the computer (given the five pseudoranges from the five satellites), a different equation is left out for each iteration of the four-dimensional estimation. Thus, a determination as to which satellite has transmitted faulty signals can be made. The differences in the position estimates obtained using each of the sets provides an indication of the scatter therebetween. The size of the scatter of the position estimates serves as an indication of the consistency of the measurements. For example, if one of the measurements is faulty, the position estimates obtained with the subsets which included this faulty measurement would provide position estimates which disagree by an amount greater than would have been expected, given the satellite geometry. In other words, the scatter of these position estimates would indicate the presence of faulty signals. The next step, then, is to identify a consistent set of at least four measurements. If at least four consistent measurements are not found, control goes to step 66 and the user is alerted that the fault detection and exclusion function is not available. If at least four consistent measurements are found, control goes to step 60.

In step 60, the computer 24 checks the consistency of the selected subset of measurements by determining whether the clock bias discrepancy is less than the clock threshold for this set, as described above in step 44. The estimates of predicted clock bias are again subtracted from the instantaneous, estimated clock bias in step 60. If the value obtained is less than the clock threshold, the predicted clock bias is accepted as a correct clock bias estimate and control is routed to step 62. In the instance where the difference is greater than the clock threshold, control goes to step 66 and a signal is provided to the user in step 52 indicating that the position estimate does not meet user requirements, and that satellite detection and exclusion is not available. The user would then switch to an alternate navigation system, as the satellite navigation system is providing faulty measurements.

In step 62, a final check is performed on the consistency of the selected measurements (at least four) by 3-D estimation. The position estimates x, y, z, are thus determined using equations from the four or more satellites, and by substituting the predicted clock bias estimates $b_p$ (t) in each equation for the previously unknown parameter b. One equation is generated by the computer for each satellite measurement whose integrity was verified as consistent in the four-dimensional estimate described above. During each estimation, a different equation is left out, so that a determination can be made as to whether any other satellites have transmitted faulty signals.

The position estimates, x, y, and z obtained from each subset of equations are examined to determine the differences therebetween. The differences in the measurement sets provide an indication of the size of the scatter, which is used by the computer 24 in step 64 to determine whether the measurement set is indeed consistent. If the measurement set is found to be inconsistent, control goes to step 66 and the user is signaled that the process of satellite detection and exclusion is not available, and control is routed to step 52. In step 52 the user is alerted that the position estimate does not meet user requirements, and that a switch to a different navigation system is needed.

However, if a measurement set is found to be consistent, control is then routed to step 68 where the user is signaled that fault detection and exclusion has been completed. In that instance control is then routed to step 70, where the user is provided with an accurate position estimate using only the satellites for which the measurements have been found to be consistent. This position estimate meets the safety requirements of civil aviation for the particular phase of flight.

Figure 3:
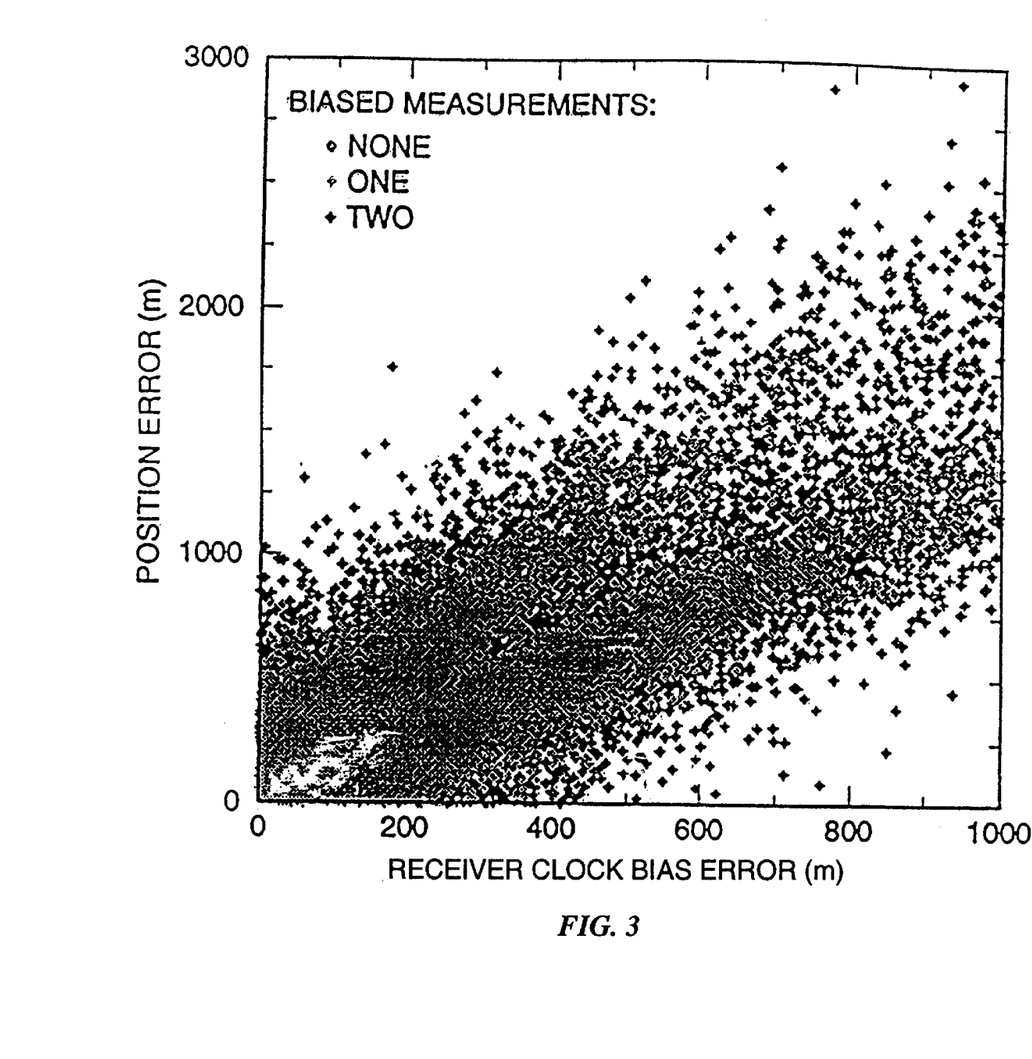
FIG. 3 is a scatter plot showing the correlation between position error and clock bias error in the presence of faulty signals from a satellite in a satellite navigation system.

Referring to the scatter plot of FIG. 3, the correlation between clock bias error and position error is shown. The position error is the discrepancy between the actual position and the faulty position estimate obtained due to faulty measurements. The scatter plot of FIG. 3 was created by simulating a GPS constellation of 24 satellites, with a $\sigma_{URE}$ value of 33 m, a $\sigma_{CPE}$ value of 20 m, and considering all satellites at an elevation of 5° above the horizon.

The scatter plot shows points in white, gray, and black each representing errors in the three-dimensional position estimates and the clock bias estimates determined from a single snapshot of pseudorange measurements. The white points represent cases where there were no measurement anomalies; the gray points represent cases where one of the satellite measurements was anomalous; and the black points represent cases where there were two measurement anomalies. Looking at the white points on the scatter plot, representing no anomalies, the distribution of errors in position and clock bias estimates is compact. Note that the position error rarely exceeds 300 m, and the discrepancy in the clock bias generally remains below 200 m. Thus, where no signal anomalies are introduced, the error in both estimates is low. With one faulty pseudorange measurement derived from a satellite, as shown in the gray portions of the scatter plot, the discrepancy between the position estimates and the clock bias estimates are clearly correlated; given one, the other can be bounded. Note that depending on the size of the anomaly and the satellite geometry, the discrepancies grow. Generally, a large clock bias discrepancy implies a large discrepancy in position. With two faulty pseudorange measurements derived from satellite signals, the band of scatter grows wider, as shown in black on the scatter plot. No qualitative change in the relationship between the discrepancy in position and the clock bias discrepancy is shown, as both errors grow proportionately.

Thus, an anomaly in the satellite navigation measurements affecting position estimates also affects receiver clock bias estimates. By using a clock having a constant or stable frequency drift rate, the clock bias can be predicted, and the discrepancy between the predicted value of clock bias and the clock bias estimate at a time t, can serve as a basis for monitoring the integrity of the current position estimates, when at least five satellites are in view and at least four satellites are providing consistent position estimates.

Variations, modifications, and other implementations of what is described herein will occur to those of ordinary skill in the art without departing from the spirit and scope of the invention as claimed. Accordingly, the invention is to be defined not by the preceding illustrative description but instead by the following claims.

What is claimed is:

1. A navigation receiver system, comprising:

a receiver for receiving signals representative of range measurements from a plurality of satellites in a satellite navigation system, the receiver comprising a clock having a substantially constant frequency drift rate for a predetermined period of time; and a processor for:
(i) creating a mathematical model to approximate the behavior of changes in the receiver clock bias over time during the predetermined period of time, and
(ii) using the mathematical model to determine whether the signals received from the plurality of satellites are faulty.

2. A method for determining position using a satellite navigation receiver system, comprising:

providing a receiver comprising a clock having a substantially constant frequency drift rate for a predetermined period of time;

receiving, at the receiver, signals from a plurality of satellites in a satellite navigation system;

generating, at a processor coupled to said receiver, position estimates from the signals;

generating smoothed clock bias estimates over the predetermined period of time during which the clock has a substantially constant frequency drift rate;

generating predicted clock bias estimates for a future period of time using said smoothed clock bias estimates;

generating an instantaneous clock bias estimate;

comparing the instantaneous clock bias estimate with a predicted clock bias estimate corresponding to the instantaneous time; and determining, based on the comparison, whether at least one of the signals is faulty.

3. The method of claim 2, further comprising:

determining whether the comparison between the instantaneous clock bias estimate and the predicted clock bias estimate at the instantaneous time is greater than a predetermined error limit.

4. The method of claim 2, further comprising:

determining whether at least five satellites are in view; and generating a plurality of sets of position estimates from the signals when said at least five satellites are in view.

5. The method of claim 4, further comprising:

determining whether the sets of position estimates are consistent; and detecting a satellite malfunction based on an inconsistent set of position estimates.

6. A navigation receiver system comprising:

a movable object;

a receiver coupled to the movable object for receiving signals representative of range measurements from a plurality of satellites in a satellite navigation system, the receiver including a clock having a substantially constant frequency drift rate over a predetermined period of time; and a processor coupled to the receiver for:
  (i) creating a model of clock bias estimates based on the substantially constant frequency drift of the clock;
  (ii) using the model to predict a clock bias estimate at an instantaneous time;
  (iii) generating a clock bias discrepancy limit;
  (iv) computing a clock bias estimate for an instantaneous time using the signals; and
  (v) subtracting the predicted clock bias estimate from the computed clock bias estimate to determine if the resulting value is greater than the clock bias discrepancy limit.

7. The navigation receiver system of claim 6, wherein the processor generates an alarm signal to an operator of the movable object indicating that at least one of the satellites is generating a faulty signal when the resulting value is greater than the clock bias discrepancy limit.

8. The navigation receiver system of claim 7, wherein the processor:

determines whether at least five satellites are in view;

generates a plurality of sets of position estimates when said at least five satellites are in view; and determines whether at least four of the sets are consistent.

9. The navigation receiver system of claim 8, wherein the processor:

determines whether an inconsistent set exists; and disregards future signals transmitted by the satellite associated with the inconsistent set.

10. A navigation receiver system, comprising:

a movable object including a receiver coupled thereto for receiving signals representative of range measurements from a plurality of satellites in a satellite navigation system, the receiver including a clock having a substantially constant frequency drift rate for at least a predetermined period of time; and a processor for:
  (i) processing the frequency drift rate and computing predicted clock bias estimates for a future period of time, including an instantaneous time;
  (ii) generating a clock bias limit defining a permissible range for clock bias estimates;
  (iii) generating an instantaneous clock bias estimate and a position estimate;
  (iv) determining whether the difference between the instantaneous clock bias estimate and said predicted clock bias estimate at an instantaneous time is within the clock bias limit;
  (v) determining whether at least five satellites are overhead; and
  (vi) performing four-dimensional estimation to determine the existence of a faulty measurement when said difference is within the clock bias limit and at least five satellites are overhead.

11. The navigation receiver system of claim 10, wherein the processor:

determines the geometry of the satellites in the satellite navigation system; and utilizes the geometry of the satellites to generate the clock bias limit.

12. The navigation receiver system of claim 10, wherein the processor:

determines the rms error value related to the predicted clock bias estimates; and utilizes the rms error value to generate the clock bias limit.

13. The navigation receiver system of claim 10, wherein the processor performs said four-dimensional estimation by generating a plurality of sets of estimates, each set having three position estimates and one clock bias estimate.

14. The navigation receiver system of claim 13, wherein the processor detects the existence of said faulty measurement by identifying at least four consistent sets of estimates and at least one inconsistent measurement.

15. The navigation receiver system of claim 14, wherein the processor further performs three-dimensional estimation by generating a plurality of sets of estimates, each set having three position estimates, and a predicted clock bias estimate.

16. The navigation receiver system of claim 10, wherein the processor generates a clock threshold using a user range error value associated with the predicted clock bias estimates.

17. The navigation receiver system of claim 16, wherein the processor determines whether the difference between the instantaneous clock bias estimate and the predicted clock bias estimate at the instantaneous time is greater than the clock threshold.

18. The navigation receiver system of claim 17, wherein the processor generates a plurality of sets of three-dimensional position estimates using the predicted clock bias estimates.

19. The navigation receiver system of claim 18, wherein the processor determines whether at least two of the plurality of sets are consistent.

20. The navigation receiver system of claim 19, wherein the processor detects a malfunctioning satellite by detecting at least two consistent sets and one inconsistent set.

21. The navigation receiver system of claim 20, wherein the processor excludes signals from the malfunctioning satellite when generating new position estimates.

* * * * *